(12) United States Patent
Twarowski

(10) Patent No.: US 6,652,778 B1
(45) Date of Patent: Nov. 25, 2003

(54) REVERSIBLE THERMOCHROMIC OPTICAL LIMITER

(75) Inventor: Allen J. Twarowski, Westlake Village, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 07/871,930

(22) Filed: Apr. 21, 1992

(51) Int. Cl.[7] .......................... G02F 1/1337; G02B 5/23
(52) U.S. Cl. ........................................ 252/582; 359/589
(58) Field of Search ................................. 252/582, 583, 252/586; 430/4, 945; 359/885, 577, 589

(56) References Cited

U.S. PATENT DOCUMENTS

| | | | | |
|---|---|---|---|---|
| 3,761,942 A | * | 9/1973 | Lorenz | 252/583 |
| 3,989,530 A | * | 11/1976 | Robillard | 252/586 |
| 4,515,877 A | * | 5/1985 | Barzynski et al. | 430/5 |
| 4,555,471 A | * | 11/1985 | Barzynski et al. | 430/273 |
| 5,230,986 A | * | 7/1993 | Neckers | 430/281 |

* cited by examiner

Primary Examiner—Charles T. Jordan
(74) Attorney, Agent, or Firm—John P. Rafter

(57) ABSTRACT

A reversible thermochromic optical limiter incorporates a thermochromic material, such as a spiropyran, that has molecules present in one of two states. At ambient temperatures the material is transparent to light. Incident laser radiation causes localized heating that turns the material to a colored state, effectively limiting transmission of the laser radiation. A laser protection device may comprise an optical focusing assembly, a nonlinear thermochromic medium, and a collimating assembly. A far field image having an intrusive laser beam, is focused through the thermochromic medium. The laser beam is focused to a small volume, causing localized heating, a large increase in optical density, and absorption of the laser light. The thermochromic medium has a fast response time over a broad wavelength band and returns to its transparent state when the laser beam subsides. The far field image is focused to a much larger volume so that it does not cause significant heating or change in optical density. The image passes through the device with a dark spot in the far field where the laser originated.

19 Claims, 1 Drawing Sheet

REVERSIBLE THERMOCHROMIC OPTICAL LIMITER

TECHNICAL FIELD

The present invention relates to light absorbing devices and, in particular, to a reversible thermochromic optical limiter that absorbs laser light while transmitting ambient light.

BACKGROUND OF THE INVENTION

Optical sensors, including the human eye, can be damaged irreparably by exposure to laser beams. The proliferation of laser devices poses a significant threat to military personnel and electro-optical sensors on the modern battlefield, for example. Clearly, a need exists for materials and methodologies to counter threats from a variety of pulsed and continuous wave laser sources that cover the visible spectrum.

Eye and sensor protection can be provided by absorbers of selected wavelengths of radiation, such as the absorptive goggles presently used for laser eye protection in optical research laboratories. In the military arena, however, the nature of enemy deployed laser devices may be unknown and ever changing. As a result, protection equipment for eyes and sensors must be operative against a broad band of damaging radiation. Because this broad band of potential laser threats includes the entire visible spectrum, conventional absorptive-type protection devices that use dyes to block light are unacceptable. Such conventional broad band absorbers would also block transmission of ambient light during non-threatening periods.

Several technologies are being explored to provide sensor and eye protection from laser light. For example, rugate filter technology has demonstrated the successful deposition of a high transmission filter having six distinct narrow bands of rejection (i.e., lines). The rejection lines of a rugate filter are fixed, however, and must be designed into the structure to counter a known threat. Thus, rugate technology is not adequate for protection against laser beams of unknown wavelength.

Nonlinear optical materials and devices are also being investigated to protect against multiple wavelength and wavelength agile (i.e., rapidly changing) laser threats. For example, Flexible Rejection Filters under development combine rugate filter and holographic technologies for real time sensor projection against pulsed or continuous wave lasers. These filters are made holographically and therefore match the laser wavelengths and directions of arrival. They also operate over a large field of view and a large spectral range.

Another approach for laser eye protection involves thermally triggered sacrificial mirrors. This technology offers rapid response, broad spectral coverage, and high sensitivity against pulsed, continuous wave, wavelength agile, and multiple wavelength laser threats. Sacrificial mirrors, however, provide one-time protection and must be disposed of after illumination by a laser threat.

All of the foregoing technologies have limitations, including excessive cost, that make them poor candidates for widely used laser protection devices. What is needed is a protective device that allows a user or sensor to function normally with ambient light when laser threats are not present. The device should be wavelength agile and exhibit broadband absorption throughout at least the visible region of the spectrum. The device should also be inexpensive and reversible so that it is not destroyed while providing laser protection.

SUMMARY OF THE INVENTION

The present invention comprises a reversible thermochromic optical limiter. The device incorporates thermochromic materials that have molecules present in one of two states. At ambient temperatures, the majority of the molecules are transparent to visible light while the remainder of the molecules are present in a colored state. The colored molecules absorb laser radiation, which is converted to heat and deposited in the surrounding nonlinear medium. As the temperature rises, the surrounding non-absorbing molecules transition to the colored state, thereby absorbing more laser radiation, generating more heat, causing further transitions to the absorbing state, and effectively limiting transmission of the laser radiation.

A thermochromic laser protection device of the present invention comprises an optical focusing assembly, a nonlinear thermochromic medium, and a defocusing (i.e., collimating) assembly. A far field image, which may include an intrusive laser beam, is focused through the thermochromic medium. The laser beam is focused to a very small volume, which causes local heating, a large increase in optical density, and absorption of the laser light. The far field image is focused to a much larger volume in the thermochromic medium so that it does not cause significant heating or change in optical density. As a result, the image passes through the device with a dark spot in the far field where the laser originated. The thermochromic medium has a fast response time and returns to its transparent state when the laser beam subsides. The performance of the thermochromic optical limiter depends on the choice of thermochromic material, the medium that carries the thermochromic material, and device parameters such as lens focal length and thickness of the nonlinear element. The selection of a thermochromic material or mixture of materials depends on the response time, dynamic range, spectral range, and recovery time required for a particular application.

A principal object of the invention is a reversible, broad band optical limiter. A feature of the invention is a thermochromic material that absorbs laser light while transmitting an ambient light image. An advantage of the invention is a reversible laser protection device having low cost and fast response time over a broad wavelength band.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
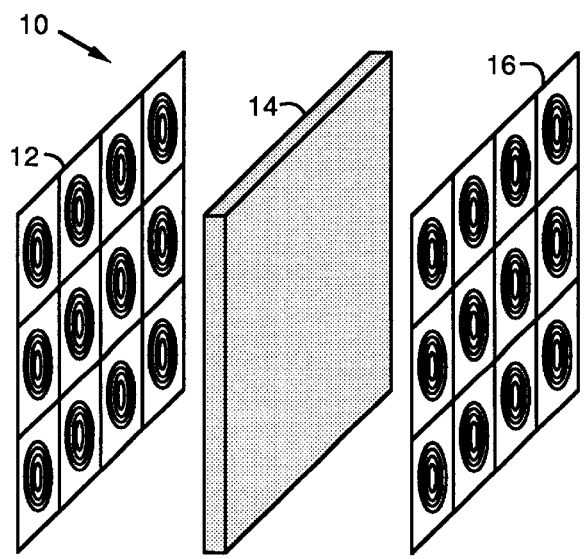
FIG. 1 is a schematic diagram of a thermochromic optical limiter of the present invention having a microlens focusing array, a reversible thermochromic medium, and a collimating microlens array.

The present invention comprises a reversible thermochromic optical limiting device. One embodiment of the optical limiter comprises a thermochromic laser protection device 10 illustrated schematically in FIG. 1. Thermochromic laser protection device 10 comprises an optical focusing assembly 12, a nonlinear thermochromic medium 14, and a defocusing (i.e., collimating) assembly 16. Focusing and collimating assemblies 12 and 16 may comprise parallel arrays of microlenses as illustrated in FIG. 1. Laser protection devices of this type may be used in binoculars and goggles for soldiers on the battlefield and for laser hardening of optical sensors in satellites, smart missiles, and reconnaissance aircraft, for example.

Thermochromic medium 14 comprises materials that have molecules present in one of two states. At ambient temperatures, the majority of the molecules are transparent to visible light while the remainder of the molecules are present in a colored state. The colored molecules absorb laser radiation, which is converted to heat and deposited locally in the surrounding nonlinear medium 14. As the temperature rises locally, non-absorbing molecules transition to the colored state, thereby absorbing more laser radiation, generating more heat, causing further transitions to the absorbing state, and effectively limiting transmission of the laser radiation. The absorption-heating-coloration process may be assisted, if required, by the addition of small amounts of strongly absorbing materials, such as carbon particles, for example, which may also display optical nonlinearities.

A far field image, which may include an intrusive laser beam, can be focused by assembly 12, on a pixel-by-pixel basis, through thermochromic medium 14. The laser beam is focused to a very small volume in medium 14, which causes localized heating, a large increase in optical density, and absorption of the laser light. The far field image is focused to a much larger volume in thermochromic medium 14 so that it does not cause significant heating or change in optical density. As a result, light from the far field passes through the device to produce an image with a dark spot where the laser originated.

An effective thermochromic medium 14 should have the following attributes: 1) the material should become highly colored at moderate temperatures and revert to its colorless state upon cooling; 2) the material should have a response time on the order of nanoseconds for coloration and laser light absorption; 3) the material should not display fatigue after multiple cycles through the colorless-colored states; 4) the material should exhibit broadband high optical density absorption for wavelength agility; 5) the material should exhibit high sensitivity, effectively limiting transmitted energy to less than a few microjoules; and 6) the material should exhibit a wide dynamic range, being effective for laser pulse energies from a few microjoules to tens of millijoules. In addition, thermochromic medium 14 should exhibit a fast recovery time in returning to its transparent state when the laser beam subsides. The reversibility of laser protection device 10 makes it ideal for uses in which sacrificial elements of conventional laser protection devices cannot conveniently be replaced.

Several types of thermochromic materials, having different coloration mechanisms, can be utilized in the reversible optical limiter of the present invention. Many thermochromic materials operate by temperature dependence of the equilibrium between a colorless and a colored isomer or stereo isomer. Other thermochromic materials operate by broadening of a near-ultraviolet absorption band, by formation of triplet states or free radicals, or by ring opening reactions.

A group of chemicals known as spiropyrans, particularly alkoxy and halogenated substituted spiropyrans, have been investigated for their ability to change color when subjected to laser light. Spiropyrans are a class of molecules characterized by a pyran ring in which an adjacent $sp^3$ hybridized carbon atom is also part of another ring system. These two rings are mutually orthogonal for solutions of the spiropyran molecule at room temperature. If the solution is heated or irradiated with light, the spiro carbon-pyran oxygen bond breaks, and the molecule rearranges into a highly colored, planar merocyanine dye structure.

EXPERIMENTAL RESULTS

Figure 2:
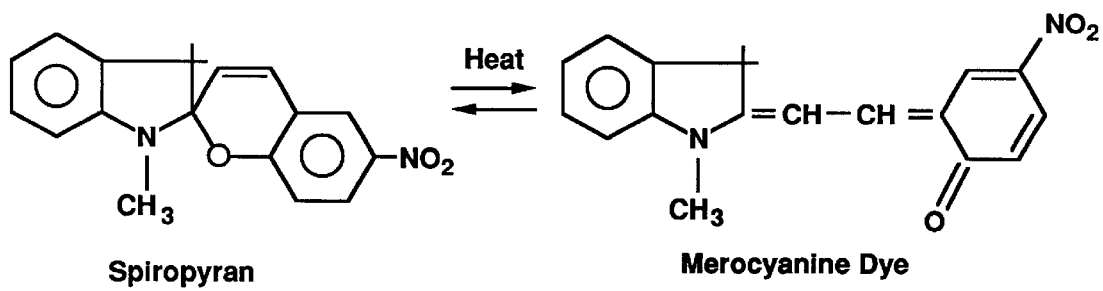
FIG. 2 is a chemical diagram of a clear spiropyran showing the effect of heat to create a colored merocyanine dye structure.

One member of the spiropyran family, 1',3',3'-trimethyl-6-nitrospiro[2H-benzo-pyran-2,2'-indoline], is illustrated diagrammatically in FIG. 2. Highly colored solutions of spiropyrans such as this can be created at moderate temperatures. For example, the absorption spectrum of a 0.06 M solution of 1',3',3'-trimethyl-6-nitrospiro[2H-benzo-pyran-2,2'-indoline] in silicone oil is nearly colorless at room temperature but attains an optical density of greater than 3.0 (corresponding to an attenuation of $10^3$) as the temperature of the solution approaches 200 degrees Celsius. The solubility limit for most spiropyrans in non-polar solvents is approximately 1 M (molar), although devices having much higher effective concentrations can be designed and constructed.

A physical-chemistry performance model of a single optical cell reversible optical limiter was constructed to investigate the sensitivity of spiropyrans to laser irradiation. The model assumes that a 0.4 M spiropyran solution (1',3',3'-trimethyl-6-nitrospiro[2H-benzo-pyran-2,2'-indoline] in silica oil) is irradiated by focused laser beams of various energies to a 4 micron waist. At the beginning of the input laser pulse, the absorption/relaxation by the initially low concentration of the colored form of the spiropyran present in the volume occupied by the laser beam waist causes heating of the medium. The colorless form of the spiropyran present in the hot irradiated volume undergoes thermal decomposition, thereby producing more of the colored laser absorbing molecule, which absorbs more laser radiation and further heats the irradiated volume.

The energy transmitted by the performance model was calculated as a function of the energy incident on the reversible optical limiter. The transmitted energy was linearly related to the incident energy from about $10^{-6}$ joule to about $4 \times 10^{-6}$ joule of input energy. However, from about $4 \times 10^{-6}$ joule to about $10^{-3}$ joule of input energy, the transmitted energy was held to a constant of about $4 \times 10^{-6}$ joule. Thus, the model cell of the reversible optical limiter, which was not optimized for a specific type of laser threat, transmitted a maximum of 5.0 microjoules over a wide range of input energies from about 6.0 microjoules to 1.0 millijoule. This dynamic range of nearly $10^3$ can be easily extended through both optical and material optimization.

Experiments have also demonstrated that the requirement of nanosecond response time can be achieved by the thermochromic optical limiter of the present invention. A pulsed dye laser (pump pulse) and a continuous wave HeNe probe beam were focused through a solution of 0.15 M spiropyran in benzene. The transient absorption of the probe beam by 1',3',3'-trimethyl-6-nitrospiro[2H-benzo-pyran-2,2'-indoline] was determined using a fast detector coupled to a 100 MHz transient digitizer. The probe laser intensity was plotted as a function of time following the firing of the pump pulse for cases where the pump laser was blocked and cases where the pump laser was allowed to irradiate the 0.15 M solution. The reversible thermochromic optical limiter was driven to its attenuating state in less than 0.1 microseconds and remained attenuating at nearly constant level over the time scale of the experiment (2 microseconds). The non-optimized device strongly attenuated incident radiation within 20 nanoseconds and fully recovered during a time span of tens of milliseconds after the radiation ceased.

A mixture of thermochromic materials can be used to construct a wavelength agile optical limiter that provides a broadband absorption spectrum, such as the entire visible spectrum, for example. The absorption spectra of a simple mixture of spiropyrans is the weighted sum of the spectra of the individual components, thus obeying Beer's law.

Compounds that block red light may be mixed together in equal concentrations with compounds that block blue-green light to effectively block laser radiation over the visible spectrum. For example, any of the compounds in Table I may be mixed with any of the compounds in Table II to form an effective blocking mixture.

TABLE I 1. 3-ethyl-3-phenyl-5'-bromo-6'-nitro-8'-methoxy-indolino benzospiropyran
2. 3-ethyl-5-chloro-indolino benzospiropyran
3. 3-ethyl-5'-bromo-6'-nitro-8'-methoxy-indolino benzospiropyran
4. 3-ethyl-5'-nitro-8'-methoxy-indolino benzospiropyran
5. 3-ethyl-6',8'-dinitro-indolino benzospiropyran
6. 8,8'-dinitro-3,3'-spirobi[3H-naphtho[2,1-b]pyran]

TABLE II 1. 3-phenyl-8-methoxy-8'-nitro-dibenzospiropyran
2. 3-phenyl-6'-nitro-8'iodo-dibenzospiropyran
3. 3-phenyl-6'-nitro-dibenzospiropyran
4. 3,5,3'-trimethyl-6'-nitro-benzoxazolinobenzospiropyran
5. 3,3'-dimethyl-6'-nitro-benzoxazolinobenzospiropyran It has also been discovered that the action of spiropyrans depends on the solvent medium that is used. Solvent viscosity and polar characteristics are two of the more important considerations. Higher viscosity solvents tend to slow the rate of change to and from the colored dye species. Solvents that may be used with spiropyrans include the following, by way of example and not limitation: silicone oil, toluene, xylene, mesitylene, butyl ether, ethyl acetate, ethyl alcohol, benzene, acetone, n-propanol, isopropanol, dimethyl phthalate, chloroform, benzyl alcohol, nitrobenzene, cyclohexane, decalin, cyclohexanone, isoamyl alcohol, glycol, diphenyl ether, pyridine, water, acetonitrile, dimethyl formamide, polystyrene, polymethylmethacrylate, paradioxane, and polyvinyl alcohol.

The usable concentration of spiropyrans can be greatly increased over solution phase solubility limits by incorporating the material into condensed phase structures. Spiropyrans can be deposited in xerogels, cast into Langmuir-Blodgett and polymer films, incorporated as guests in liquid crystals, and cast as copolymers. The use of a condensed phase thermochromic material in a reversible optical limiter may be desirable for some applications because higher concentrations can be obtained and the fatigue rate may be lower.

Although spiropyrans are a large class of molecules, relatively few of the materials of interest are commercially available. Thus, they may require synthesis from commercially available reagents. The synthesis of many of the spiropyrans involves the condensation of an alkylidene heterocycle with a beta-hydroxyacrolein aromatic compound. The synthesis is known in the art and the reagents are readily available.

Figure 3:
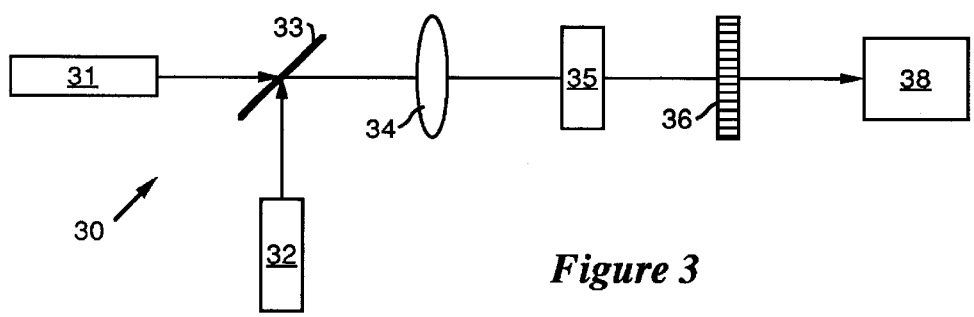
FIG. 3 is a schematic diagram of a test apparatus used to characterize thermochromic materials such as spiropyran solutions.

A test apparatus such as illustrated in FIG. 3 may be used for testing the transient response of thermochromic materials. The test apparatus 30 comprises a tunable, nanosecond pulse dye laser 31, a tunable continuous wave dye laser 32, a beam splitter 33, a lens 34, a thermochromic medium 35, a filter 36, and a photo-detector 38. Pulse laser 31 operates throughout the entire visible spectrum to generate a thermal equilibrium shift that causes an optical density change in thermochromic medium 35. Continuous wave dye laser 32 probes the optical density change in medium 35 as a function of time following the start of a switching laser pulse from laser 31. Beam splitter 33 combines, aligns, and directs light from the tunable nanosecond pulse dye laser 31 and the tunable continuous wave dye laser 32 into lens 34. Lens 34 directs the focused energy into medium 35, which may comprise a cell containing a spiropyran compound or other thermochromic mixture to be characterized. Light emerging from medium 35 passes through filter 36 and propagates to a photodetector 38. Filter 36 allows the probe dye laser beam to be separated from the pulsed laser beam either by polarization or spectral dispersion. Photodetector 38 provides a signal proportional to the transmittance of the cw dye laser intensity, which may be recorded with a digital oscilloscope, for example. The speed of the thermochromic reaction, the extent of optical attenuation, and the recovery time of the medium can be determined from this data.

In addition to the spiropyrans described above, there are many other compounds which are known to be thermochromic and which may be employed in the thermochromic optical limiter of the present invention. The following references, which are incorporated herein by reference, include voluminous lists of thermochromic compounds that may be employed in the reversible thermochromic optical limiter of the present invention: R. Fox, "Research Reports and Test Items Pertaining to Eye Protection of Air Crew Personnel," Final Report AF 41(657)-215, Defense Technical Information Center (DTIC) AD 440226, April 1961; J. Day, "Thermochromism," Chem. Rev., Vol. 63, pp. 65–80, 1963; R. Bertelson, "Effort to Evolve a Method of Eye Protection from Flash Blindness," Defense Technical Information Center (DTIC) AD 645730, Jan. 1967; and R. Bertelson, "Photochromic Processes Involving Heterolytic Cleavage," Techniques of Chemistry: Photochromism, Vol. III, Chap. 3, pp. 45–431, Wiley-Interscience, New York, 1971.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A reversible thermochromic optical limiter, comprising:
   a thermochromic material having a first state substantially transparent to radiation and a second state substantially absorbing of radiation;
   said thermochromic material locally switchable from said first state to said second state by laser irradiation that causes a localized temperature rise in said material and switchable from said second state to said first state when said laser irradiation ceases; and
   means for focusing light through said thermochromic material, said thermochromic material transmitting an ambient light image while locally switching to said second state to absorb any of said laser irradiation present in said light.

2. The reversible thermochromic optical limiter of claim 1, wherein said thermochromic material comprises a spiropyran.

3. The reversible thermochromic optical limiter of claim 2, wherein said thermochromic material comprises a solution containing said spiropyran.

4. The reversible thermochromic optical limiter of claim 3, wherein said solution containing said spiropyran includes a solvent selected from the group consisting of silicone oil, toluene, xylene, mesitylene, butyl ether, ethyl acetate, ethyl alcohol, benzene, acetone, n-propanol, isopropanol, dimethyl phthalate, chloroform, benzyl alcohol, nitrobenzene, cyclohexane, decalin, cyclohexanone, isoamyl alcohol, glycol, diphenyl ether, pyridine, water, acetonitrile, dimethyl formamide, polystyrene, polymethylmethacrylate, paradioxane, and polyvinyl alcohol.

5. The reversible thermochromic optical limiter of claim 2, wherein said thermochromic material comprises a mixture of spiropyrans, each of said spiropyrans sensitive to a different wavelength band of radiation.

6. The reversible thermochromic optical limiter of claim 2, wherein said thermochromic material comprises said spiropyran incorporated into a condensed phase structure.

7. The reversible thermochromic optical limiter of claim 6, wherein said condensed phase structure comprises said spiropyran incorporated into a material selected from the group consisting of xerogels, Langmuir-Blodgett films, polymer films, liquid crystals, and copolymers.

8. The reversible thermochromic optical limiter of claim 2, wherein said spiropyran comprises 1',3',3'-trimethyl-6-nitrospiro[2H-benzo-pyran-2,2'-indoline].

9. A laser protection device, comprising:
a thermochromic medium, said medium comprising thermochromic material having a first state substantially transparent to radiation and a second state substantially absorbing of radiation;
said thermochromic material reversibly switchable from said first state to said second state by a temperature rise caused by laser irradiation of said material and from said second state to said first state when said laser irradiation ceases;
means for focusing light through said thermochromic medium, said medium transmitting ambient light while locally switching to said second state to absorb any of said laser irradiation present in said light; and
means for collimating said ambient light transmitted through said thermochromic medium to form an ambient light image without said laser irradiation.

10. The reversible thermochromic optical limiter of claim 9, wherein said thermochromic material comprises a spiropyran.

11. The reversible thermochromic optical limiter of claim 10, wherein said thermochromic material comprises a solution containing said spiropyran.

12. The reversible thermochromic optical limiter of claim 11, wherein said solution containing said spiropyran includes a solvent selected from the group consisting of silicone oil, toluene, xylene, mesitylene, butyl ether, ethyl acetate, ethyl alcohol, benzene, acetone, n-propanol, isopropanol, dimethyl phthalate, chloroform, benzyl alcohol, nitrobenzene, cyclohexane, decalin, cyclohexanone, isoamyl alcohol, glycol, diphenyl ether, pyridine, water, acetonitrile, dimethyl formamide, polystyrene, polymethylmethacrylate, paradioxane, and polyvinyl alcohol.

13. The reversible thermochromic optical limiter of claim 10, wherein said thermochromic material comprises said spiropyran incorporated into a condensed phase structure.

14. The reversible thermochromic optical limiter of claim 13, wherein said condensed phase structure comprises said spiropyran incorporated into a material selected from the group consisting of xerogels, Langmuir-Blodgett films, polymer films, liquid crystals, and copolymers.

15. The reversible thermochromic optical limiter of claim 10, wherein said thermochromic material comprises a mixture of spiropyrans, each of said spiropyrans sensitive to a different wavelength band of radiation.

16. The reversible thermochromic optical limiter of claim 11, wherein said mixture of spiropyrans comprises a thermochromic material selected from the group consisting of 1',3',3'-trimethyl-6-nitrospiro[2H-benzo-pyran-2,2'-indoline]; 3-ethyl-3-phenyl-5'-bromo-6'-nitro-8'-methoxy-indolino benzospiropyran; 3-ethyl-5chloro-indolino benzospiropyran; 3-ethyl-5'-bromo-6'-nitro-8'-methoxy-indolino benzospiropyran; 3-ethyl-5'-nitro-8'-methoxy-indolino benzospiropyran; 3-ethyl-6',8'-dinitro-indolino benzospiropyran; 8,8'-dinitro-3,3'-spirobi[3H-naphtho[2,1-b]pyran]; 3-phenyl-8-methoxy-8'-nitro-dibenzospiropyran; 3-phenyl-6'nitro-8'iodo-dibenzospiropyran; 3-phenyl-6'-nitro-dibenzospiropyran; 3,5,3'-trimethyl-6'-nitro-benzoxazolino-benzospiropyran; and 3,3'-dimethyl-6'-nitro-benzoxazolino-benzospiropyran.

17. A reversible thermochromic laser protection device, comprising:
a thermochromic medium comprising a spiropyran in a form selected from the group consisting of condensed phase structures and solutions, said solutions including said spiropyran in a solvent selected from the group consisting of silicone oil, toluene, xylene, mesitylene, butyl ether, ethyl acetate, ethyl alcohol, benzene, acetone, n-propanol, isopropanol, dimethyl phthalate, chloroform, benzyl alcohol, nitrobenzene, cyclohexane, decalin, cyclohexanone, isoamyl alcohol, glycol, diphenyl ether, pyridine, water, acetonitrile, dimethyl formamide, polystyrene, polymethylmethacrylate, paradioxane, and polyvinyl alcohol, said spiropyran having molecules present in a first state substantially transparent to radiation and a second state substantially absorbing of radiation;
said spiropyran molecules reversibly switchable from said first state to said second state by a temperature rise caused by laser irradiation of said thermochromic medium and from said second state to said first state when said laser irradiation ceases;
means for focusing light through said thermochromic medium, said medium transmitting ambient light but absorbing any of said laser irradiation present in said light as a result of locally heated spiropyran molecules switching to said second state; and
means for collimating said ambient light transmitted through said thermochromic medium to form an image without said laser irradiation.

18. The reversible thermochromic laser protection device of claim 17, wherein said spiropyran is incorporated into a condensed phase structure comprising a material selected from the group consisting of xerogels, Langmuir-Blodgett films, polymer films, liquid crystals, and copolymers.

19. The reversible thermochromic optical limiter of claim 17, wherein said spiropyran comprises a mixture of thermochromic materials selected from the group consisting of 1',3',3'-trimethyl-6-nitrospiro[2H-benzo-pyran-2,2'-indoline]; 3-ethyl-3-phenyl-5'bromo-6'-nitro-8'-methoxyindolino benzospiropyran; 3-ethyl-5-chloro-indolino benzospiropyran; 3-ethyl-5'-bromo-6'-nitro-8'-methoxy-indolino benzospiropyran; 3-ethyl-5'-nitro-8'-methoxy-indolino benzospiropyran; 3-ethyl-6',8'-dinitro-indolino benzospiropyran; 8,8'-dinitro-3,3'-spirobi[3H-naphtho[2,1-b]pyran]; 3-phenyl-8-methoxy-8'-nitro-dibenzospiropyran; 3-phenyl-6'nitro-8'iodo-dibenzospiropyran; 3-phenyl-6'-nitro-dibenzospiropyran; 3,5,3'-trimethyl-6'-nitro-benzoxazolino-benzospiropyran; and 3,3'-dimethyl-6'-nitro-benzoxazolino-benzospiropyran.

* * * * *